United States Patent [19]

Cronin

[11] Patent Number: 4,493,146
[45] Date of Patent: Jan. 15, 1985

[54] QUICK ATTACH DETACH INSTRUMENT PANEL METHOD

[75] Inventor: Michael J. Cronin, Sherman Oaks, Calif.

[73] Assignee: Lockheed Corporation, Burbank, Calif.

[21] Appl. No.: 330,212

[22] Filed: Dec. 14, 1981

Related U.S. Application Data

[62] Division of Ser. No. 107,414, Dec. 26, 1979, Pat. No. 4,367,513.

[51] Int. Cl.³ ............................................. H01R 43/00
[52] U.S. Cl. .................................................... 29/857
[58] Field of Search ................... 29/857; 361/331, 346, 361/350, 355, 395, 399, 400, 408, 417–420, 427, 428; 339/17 C, 17 F, 17 B, 75 MP; 200/51 R, 153 M, 61.66, 153 LB, 296, 336; 307/10 R, 112

[56] References Cited

U.S. PATENT DOCUMENTS

| | | | |
|---|---|---|---|
| T955,008 | 2/1977 | Gregor et al. | 361/400 |
| 2,958,063 | 10/1960 | Stanwyck | 339/17 C |
| 3,846,740 | 11/1974 | Damon | 339/17 C |
| 3,955,124 | 5/1976 | Jones | 361/400 |
| 4,109,120 | 8/1978 | Tyler | 361/350 |
| 4,144,555 | 3/1979 | McGalliard | 361/346 |
| 4,167,658 | 9/1979 | Sherman | 200/44 |
| 4,255,005 | 3/1981 | Fukunaga | 339/17 C |
| 4,280,062 | 7/1981 | Miller et al. | 361/428 |

*Primary Examiner*—Howard N. Goldberg
*Assistant Examiner*—P. W. Echols
*Attorney, Agent, or Firm*—Louis L. Dachs

[57] ABSTRACT

A quick attach/detach instrument panel and method in which the panel may be both mechanically and electrically connected to the support frame by zero insertion force connectors and in which the individual instruments on the panel may be easily removed from the front of the panel and electrically and mechanically connected thereto by zero insertion force connectors.

4 Claims, 9 Drawing Figures

QUICK ATTACH DETACH INSTRUMENT PANEL METHOD

This application is a division of application Ser. No. 107,414, filed 12/26/79, now U.S. Pat. No. 4,367,513.

TECHNICAL FIELD

The present invention relates to an instrument panel such as found in aircraft, automobiles, equipment test consoles and the like. Such panels generally have a significant amount of wiring behind the panels connected to the various instruments. It is the improvement of such panels in relation to their ease of access and maintainability to which this invention pertains.

BACKGROUND ART

Typically, the wiring for an aircraft instrument panel is run to the panel location, the panel with the instruments mounted thereon is brought to the location, and the electrical connections are made between the wiring and the instruments prior to the mechanical installation of the panel. Due to the often extreme space limitations behind the panel, the removal of an individual instrument from the panel is often difficult and many times can only be reached by reaching up behind the panel to unscrew the instrument connection. Many times this is done blind. This means that these maintenance actions are extremely time-consuming and must, of course, be performed on site. FIG. 1 of the drawings, as explained below in some detail is quite typical of instrument panels of this character, which are extensively utilized throughout the aircraft industry.

DISCLOSURE OF INVENTION

Departing from the instrument panel approach generally utilized throughout the prior art, the present invention provides a means whereby the entire instrument panel, or discrete portions thereof, may be quickly and easily removed from its installed position within the aircraft. This is accomplished by providing a quick attach/detach instrument panel in which the entire panel may be simply removed. The entire panel may be thus easily electrically and mechanically disconnected from the structure and removed to a shop or more spacious area for easy access to the instruments and to the wiring between the instruments and the panel connectors.

It is also desirable when the maintenance or replacement of an individual instrument is required, to have the ability to easily disconnect, remove and replace it readily without disturbing adjacently located instruments, or to accommodate its movement to a suitable work area of repair.

Another object of the present invention is to provide a novel method and instrument panel in which the individual instruments may be electrically and mechanically connected to the instrument panel by means of zero insertion force connectors accessible from the front of the panel.

These and other objects and advantages will be readily apparent from the claims and from the following detailed description when read in conjunction with the appended drawings.

BEST MODE OF CARRYING OUT THE INVENTION

Figure 1:
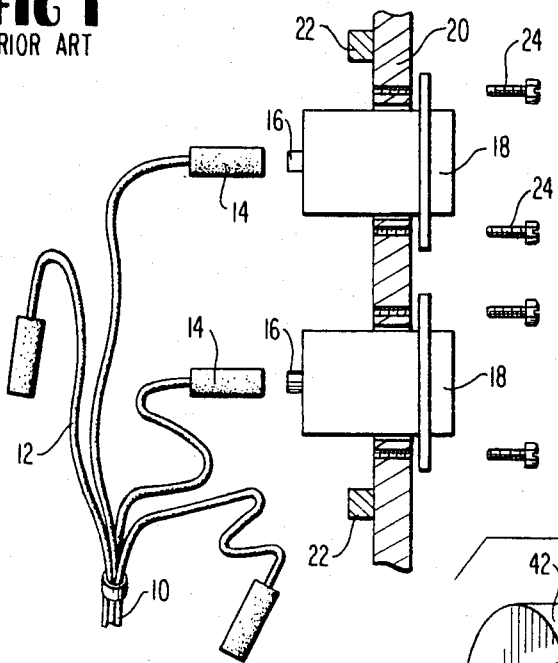
FIG. 1 is an elevation in partial section of a portion of a typical prior art instrument panel.

With reference to FIG. 1 and to the side elevation of a typical prior art instrument panel there illustrated, a wiring harness 10 having a plurality of individual cables 12 is shown. Each of the cables 12 typically terminates in conventional electrical connectors 14 which mate with the connector 16 on the rear of the individual instruments 18 of the instrument panel 20. The instrument panel 20 is mounted to the structural support 22 by any suitable conventional means (not shown), and the individual instruments 18 may be mounted to the instrument panel 20 by means of any suitable conventional mechanical fasteners such as the bolts 24 illustrated in the drawing.

In installing the panel, the instruments 18 are typically secured to the instrument panel 20 by means of the bolts 24 and the instrument panel brought as a unit to the site. Before mechanically securing the instrument panel 20 to the structural support 22, each of the connectors 14 on the ends of the cables 12 behind the panel must be electrically connected to an instrument 18. Also, to permit front removal of an instrument, additional "slack" must be allowed in cable harness 10, so that it can be pulled through to the front of the panel to remove connectors 14. As a result, the back of the instrument panel, when mechanically secured to the supporting structure, generally has a considerable length of cable coiled up or folded over itself and/or other cables as well as the supporting structure, giving rise to the possibility of cable damage. In addition, the amount of cable behind the panel exacerbates the problem in obtaining access to the connectors 14, 16 with the instrument panel secured to the supporting structure, e.g., when it is desired to replace an individual instrument.

Figure 2:
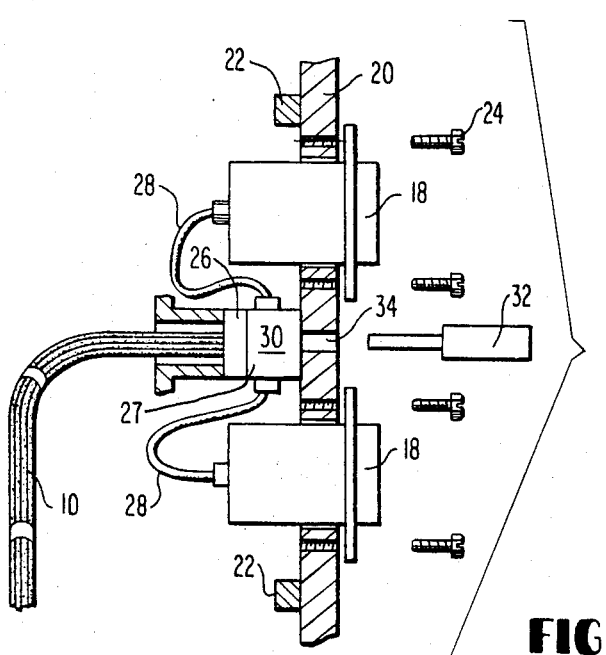
FIG. 2 is a side elevation in partial section of one embodiment of the quick attach/detach instrument panel of the present invention.

With reference to FIG. 2 where a first embodiment of the present invention is illustrated, the wiring harness 10 behind the instrument panel may terminate into a central, or common, zero insertion force (ZIF) connector which distributes separate cables 28 to the individual instruments. In this case, the termination to connectors is made without the use of the mating connector 14.

This means that the instrument panel may be manufactured as a modular assembly in the production shops and that the individual connectors on the wiring harness 10 (in FIG. 1) are eliminated. Wire connections into the instrument may be made by wire-wrap or by mechanical methods known in the trade as "poke home" connections, Termi-point connections or Flexpoint connections. In the "poke home" type, the individual wires are terminated in a mechanical crimp type connection and inserted into their sockets with a special tool. The mechanical types use special sleeves or pellets to clamp the wires to pins provided on the instruments.

The instrument panel 20 with the instruments 18 mechanically secured thereto and electrically connected by means of the cables 28 to the ZIF connector 30 may be brought to the site and installed by mating of the two halves 26, 27 of the ZIF connector 30 and by the use of any suitable conventional means (not shown) to mechanically secure the panel 20 to the support structure 22. Thereafter, a key 32 may be inserted into an aperture 34 in the panel 20 to interface with the key shift on the ZIF connector to establish a firm electrical contact between the conductors of the wiring harness 10 and the instruments 18.

The ZIF connector 30 illustrated in FIG. 2 may be of the type wherein the electrical pins on the mating portions thereof by-pass each other on slightly spaced parallel paths on insertion. Insertion of the key 32 through the hole 34 into the panel and into the ZIF connector 30, upon the rotation thereof one-quarter turn, will move the pins laterally to establish pin-to-pin contacts.

Figure 3:
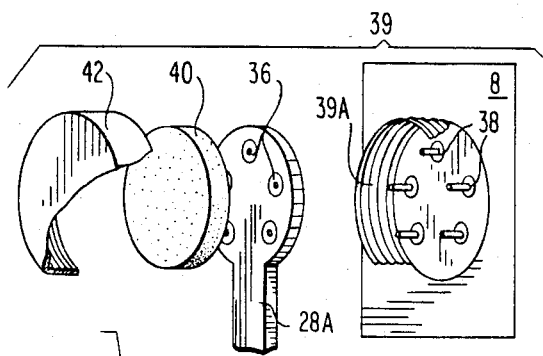
FIG. 3 is one embodiment of a zero insertion force connector utilized in the present invention.

In an alternative embodiment to that of FIG. 2, the cable 28 extending from the instrument 18 may not be hard wired thereto as illustrated in FIG. 2, but may be connected by means of a different type of ZIF connector. As the above described connections to the instruments provide "semi-permanent" type connections, an alternative embodiment is shown in FIG. 3, where flat cable 28A is interfaced directly with a connector 39. This connector has "face-pads" which match pads provided in the flat cable and is another form of ZIF connector.

Still referring to FIGS. 2 and 3, an instrument 18 is installed by the following method or procedure:

(a) A panel 20 is provided which has an aperture adapted to receive the instrument 18 and, further, having one mating portion 27 of a zero insertion force electrical connector 30 electrically connected to electrical wiring 10 behind the panel 20.

(b) An instrument 18 is provided which has an electrical conductor 28 terminating in the other portion 27 of the zero insertion force electrical connector 30. The length of the conductor 28 is such as to permit withdrawal of the instrument 18 from the panel 20 from the front thereof without disconnecting the zero insertion force electrical connector 30.

(c) The two portions 26 and 27 of the zero insertion force electrical connector 30 are mated with the instrument 18 not secured to the panel and the front of the panel 20 with the conductor 28 extending through the aperture for the instrument.

(d) The zero insertion force electrical connector 30 is operated from the front side of the panel 20 to establish an electrical connection between the instrument 18 and the electrical wiring 10 behind the panel.

(e) The instrument 18 is inserted into the panel 20 from the front.

(f) The instrument 18 is mechanically secured to panel 20 from the front thereof.

For example, and with reference to FIG. 3, the cable 28 of FIG. 2 may be replaced by a flat or ribbon conductor 23A terminating in a generally disc-like connector in which the individual wires from the cable 28 are connected within the disc to face pads 36 which may be apertured to receive alignment pins associated with corresponding face pads 38 on the instrument 18. The apertures in the face pads 36 may be slightly larger than the alignment pins associated with the face pads 38 so that there is zero insertion force in placing the face pads 36, 38 adjacent each other.

As illustrated in FIG. 3, the face pads 38 of the instrument 18 may be surrounded by an externally threaded sleeve slit along one side to accommodate the exit of the flat cable 28 therefrom. A generally cylindrical resilient disc 40 may then be placed in overlaying relation to the end of the flat conductor, and an internally threaded cap 42, when threaded onto the cylinder 39A, may be used to apply pressure through the resilient disc 40 to urge the conductors 36, 38 into electrical contact.

The ZIF connectors of the flat cable type are described in more detail in the Cronin patent application Ser. No. 107,260, filed Dec. 26, 1979, and assigned to the assignee of the present invention.

Figure 4:
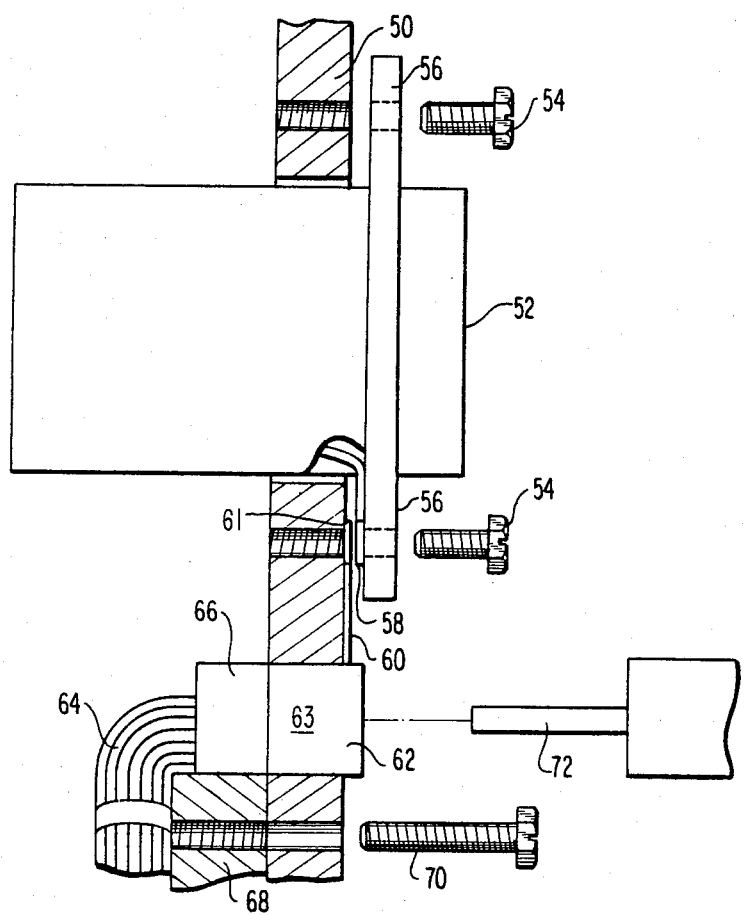
FIG. 4 is a side elevation in partial section of a second embodiment of the quick attach/detach instrument panel of the present invention.

Another embodiment of the instrument panel of the present invention is illustrated in FIG. 4. With reference to FIG. 4, an instrument panel 50 is provided with an aperture to receive an instrument 52. The instrument 52 may be mechanically connected to the instrument panel 50 by means of suitable conventional threaded fasteners 54 extending through apertures in a flange 56 around the instrument 52. Alternatively, these as well as other mechanical connections described above may be provided by quick disconnect fasteners inserted and rotatable through one-quarter turn to obtain a secure mechanical connection.

The mechanical connection of the instrument 52 to the panel 50 will also serve to establish the electrical connection between the instrument and wiring carried by the panel 50 on the face thereof.

With continued reference to FIG. 4, the wiring from the instrument 52 may exit the instrument from a point immediately behind the flange 56 and be carried on the rear surface thereof in the form of a flat electrical connector terminating in the disc of the type illustrated in connection with FIG. 3.

In the embodiment illustrated in FIG. 4, the aperture for the flange 56 in which the threaded fastener is inserted will be aligned with the aperture of the connector 58 from the instrument 52 to insure the proper alignment thereof. Similarly, the instrument panel 50 may be provided with a flat conductor 60 and a disc connector 61 surrounding the aperture in the panel 50 adapted to receive the fasteners 54. Thus, the mechanical securing of the instrument to the instrument panel 50 will also establish the electrical connection between the instrument 52 and the wiring 60 on the face of the instrument panel. Such connectors may be of the zero insertion force type, generally illustrated in FIG. 3, with a central aperture to secure the alignment thereof and may include a resilient disc (not shown). Thus, if the connector is of the zero insertion force type illustrated in FIG. 3, then the disk connector 61 is a female half and the connector 58 is the male half.

With continued reference to FIG. 4, the instrument panel 50 may be provided with one portion 62 of a master ZIF connector 63 of the wiring harness 64 said wiring harness located behind the panel. The other portion 66 of the master ZIF connector 63 may be secured to the support 68 for the instrument panel 50. The instrument panel 50 may be secured by any suitable conventional fastener 70 to the supporting structure 68.

In operation, the instrument panel with the instruments may be assembled in a remote location and brought to the supporting structure for installation. The mating of the portions 62 and 66 of the master ZIF connector 63 may be accomplished as the instrument panel 50 is mechanically secured to the supporting structure 68. The insertion and rotation of the key 72 into the master ZIF connector 63 may thereafter establish the electrical connection between the wiring in the harness 64 behind the instrument panel 50 and the instrument 52 through the flat conductors 60 on the face of the instrument panel.

Removal of a single instrument may thereafter be easily accomplished by removal of the fasteners which simultaneously establishes the mechanical connection of the instrument to the instrument panel and the electrical connection between the cable from the instrument and the wiring on the face of the instrument panel. As is readily apparent, the need for access to the rear of the instrument panel is significantly reduced as are the length of cable requirements.

From the foregoing description of the embodiment illustrated in FIG. 4, it can be seen that the method of installing such a modular quick attach/detach instrument panel would include the following steps:

(a) Providing a panel 50. The panel 50 incorporates a plurality of apertures adapted to receive a plurality of instruments 52, a female member 61 of a zero insertion force connector in close proximity to each of the apertures, and a male portion 62 of a master zero insertion force connector 63 mounted thereon at a discrete distance from each of the apertures.

(b) Each of the female members 61 of the zero insertion force connectors mounted in close proximity to each of the apertures are electrically connected to the male portion 62 of the master zero insertion force connector 63.

(c) A plurality of instruments 52 are provided each having a flange and a male portion 58 of the zero insertion force connector carried by the flange 56.

(d) Each of the instruments 52 is inserted into each of the apertures in the panel 50 with the flange 56 overlying the panel 50 and the male and female portions 58 and 61 of the connectors in mating arrangement.

(e) The instruments 52 are mechanically secured to the panel 50.

(f) The panel 50 is thereafter transported to the installation site.

(g) The panel 50 is then mechanically secured to the supporting structure 68 at the site with the male portion 62 of the master zero insertion force connector 63 mating with a female portion 66 of the zero insertion force connector 63 carried by the supporting structure 68.

(h) The master zero insertion force connector 63 is then manually operated to establish electrical connection to the panel 50.

Figure 5:
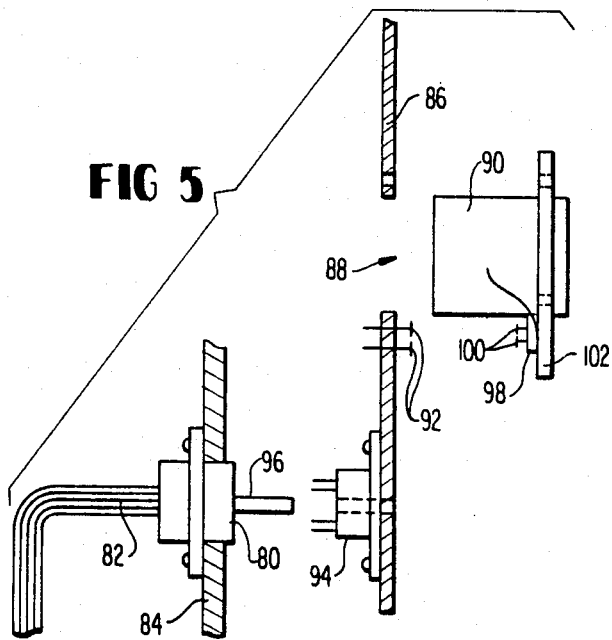
FIG. 5 is a side elevation in partial section of a third embodiment of the quick attachdetach instrument panel of the present invention.
Figure 6:
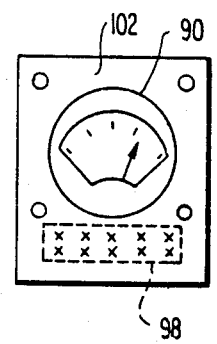
FIG. 6 is a front elevation of the instrument illustrated in FIG. 5.

Another embodiment of the panel of the present invention having quick attach/detach instruments is shown in FIGS. 5 and 6. With reference to FIGS. 5 and 6, the female portion 80 of a ZIF connector may be wired to a cable 82 and mechanically carried by the aircraft supporting structure 84.

A panel 86 is provided with an aperture 88 adapted to receive an instrument 90. The panel 86 may include a number of "nail head" or contact pad pins 92 extending through but electrically insulated from the panel 86. The panel 86 may also be provided with the male portion 94 of a ZIF connector and the portion 94 as well as the panel 86 are apertured to permit the pin 96 of the female portion 80 to extend therethrough for manual operation from the front of the panel. The male portion 94 may be electrically connected to the pins 92 by printed circuit pads cemented to the panel or by wire wrap or other suitable conventional mass production techniques.

As shown in FIGS. 5 and 6, the instruments 90 have a pin array 98 conveniently located on the rear side of the flange 102 of the instrument. The pin array 98 may include surface connectors or face pads 100 adapted to mate with the pins 92 upon the mounting of the instrument 90 in the aperture 88 of the panel 86. Thus, both instrument-to-panel and panel-to-ship's wiring may be of the quick attach/detach type.

Figure 7:
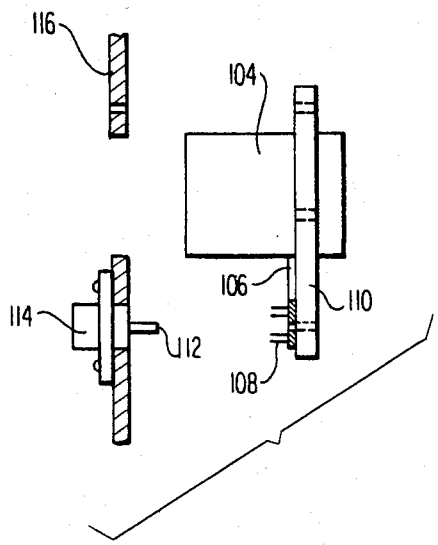
FIG. 7 is a further embodiment of the instrument and panel interface of the present invention.
Figure 8:
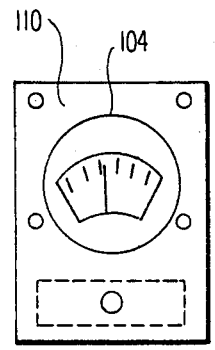
FIG. 8 is a front elevation of the instrument of FIG. 7.

One alternative to the instrument-to-panel interface is illustrated in FIGS. 7 and 8 where an instrument 104 is electrically connected by a flat cable 106 to the pins 108 of a terminal board carried on the rear side of the flange 110 of the instrument 104. The terminal board and the flange 110 may be apertured to receive the key 112 from the female portion 114 of a ZIF connector carried by the panel 116. In this way, the instrument may be mechanically secured to the panel and the electrical connections thereafter established by the manual operation of the key to the ZIP connector from the front of the panel. In this manner, both the instrument-to-panel and panel-to-shipside wiring electrical interfaces may be selectively established by the manual operation of keys from the front of the panel.

It should be noted that if the zero insertion force connector illustrated in FIG. 7, including female portion 114 mounted on the panel 116 and the male portion comprising the pins 108 mounted on the flange 110 on the instrument 104, were used instead of the male and female halves of the zero insertion force connector 58 and 68 illustrated in FIG. 4, then the procedure for electrically connecting the master zero insertion force connector 63 to the instrument 52 would require the additional step of manually operating the key 112 on the female portion 114 of the zero insertion force connector as shown in FIG. 7 prior to transporting the panel to the installation site.

Figure 9:
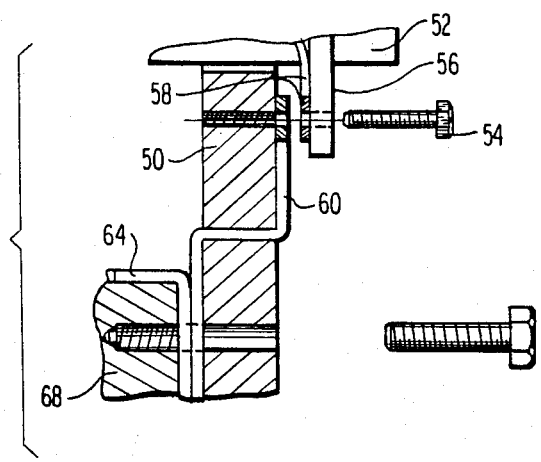
FIG. 9 is a side elevation in partial section of still another embodiment of the present invention.

In a still further embodiment as illustrated in FIG. 9 where like numbers are utilized to indicate like elements with the embodiment illustrated in FIG. 4, a flat ZIF connector may be used for both the meter-to-panel connection and the panel-to-supporting structure connection. Thus, a mechanical connection between the instrument panel 50 and the supporting structure 68 may be simultaneously established with the electrical connection between the wiring harness or shipside wiring 64 and the wiring 60 on the face of the instrument panel.

If in the embodiment as illustrated in FIG. 4 the connectors, in close proximity to the instruments installed in each of the apertures are of a face-pad type as illustrated in FIG. 9, then, the step of mechanically securing the instruments 52 to the panel 50 establishes electrical contact between the master zero insertion force connector 63 and each of the instruments.

INDUSTRIAL APPLICABILITY

The type of panel in which the present invention is particularly useful is one having a large number or a matrix of small components. As an example, it is particularly suited for a bank of annunciator legends or load control lamps in the cockpit of an aircraft. Removal and replacement of the components and/or the instrument panel for repair is, thus, expedited. This also serves to minimize the down time of the instrument panel and to minimize the congestion in crowded areas such as the cockpit of an aircraft.

The amount of space behind an instrument panel is also significantly reduced, and much greater structural support and, thus, stability of the electrical connections is achieved. This in turn reduces the number of failures occasioned by mechanical vibrations and the like. A still greater appreciation of the present invention may be gained by reference to the copending Cronin application Ser. No. 107,365, filed concurrently herewith for "Method and Modular Instrument Panel Assemblies Using Transmitter and Repeater Instrument Movements", the disclosure of which is herein incorporated by reference.

I claim:

1. A method for installing a modular quick attach-/detach instrument panel comprising the steps of:
    (a) providing a panel having a plurality of apertures adapted to receive a plurality of instruments, having a female member of a zero insertion force connector in close proximity to each of said apertures, said panel having a male portion of a master zero insertion force connector mounted to said panel at a discrete distance from each of the apertures;
    (b) electrically connecting each of said female members of said zero insertion force connectors mounted in close proximity to each of said apertures to said male portion of said master zero insertion force connector;
    (c) providing a plurality of instruments each having a flange and a male portion of said zero insertion force connector carried by said flange;
    (d) inserting one of said instruments into each of said apertures in said panel with said flange overlying said panel with said male and female portions of said connectors in a mating arrangement;
    (e) mechanically securing the instruments to the panel;
    (f) transporting the panel to the installation site;
    (g) mechanically securing the panel to a supporting structure at the site with said male portion of said master zero insertion force connector mating with a female portion of said master connector carried by said supporting structure; and
    (h) manually operating the master connector to establish electrical connections to the panel.

2. The method of claim 1 wherein said connectors in close proximity with each of said instruments installed in each of said apertures are of the manually operable type; and
    including the step of manually operating each of said connectors to establish electrical connection between said master connector and each of said instruments prior to transporting said panel to said installation site.

3. The method of claim 1 wherein said connectors in close proximity to said instruments installed in each of said apertures are of the face pad type whereby the step of mechanically securing said instruments to said panel establishes electrical contact between said master connector and each of said instruments.

4. A method of mounting an instrument within a panel comprising the steps of:
    (a) providing a panel having an aperture adapted to receive an instrument and having one mating portion of a zero insertion force electrical connector electrically connected to electrical wiring behind the panel;
    (b) providing an instrument having an electrical conductor terminating in the other mating portion of the zero insertion force electrical connector, the length of the conductor being such as to permit withdrawal of the instrument from the panel from the front thereof without disconnecting the zero insertion force connector;
    (c) mating the two portions of the zero insertion force connector with the instrument not secured to the panel and in front of the panel and with the conductor extending through the aperture for the instrument;
    (d) operating the zero insertion force connector from the front side of the panel to establish an electrical connection between the instrument and the electrical wiring behind the panel;
    (e) inserting the instrument into the panel from the front thereof; and,
    (f) mechanically securing the instrument to the panel from the front thereof.

* * * * *